United States Patent
Saito et al.

(10) Patent No.: US 7,072,383 B2
(45) Date of Patent: Jul. 4, 2006

(54) PATH SEARCH METHOD OF SPREAD SPECTRUM COMMUNICATION SYSTEM AND RECEIVER USING THE METHOD

(75) Inventors: Tadashi Saito, Tokyo (JP); Michihiro Ohsuge, Tokyo (JP); Kouiti Tamura, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 775 days.

(21) Appl. No.: 09/781,234

(22) Filed: Feb. 13, 2001

(65) Prior Publication Data

US 2001/0014116 A1    Aug. 16, 2001

(30) Foreign Application Priority Data

Feb. 14, 2000    (JP) ............................. 2000-035374

(51) Int. Cl.
    H04B 1/69      (2006.01)
    H04B 1/713     (2006.01)
(52) U.S. Cl. .................. 375/148; 375/149; 375/150
(58) Field of Classification Search ............ 375/148, 375/147, 150, 130, 136, 131; 455/450, 500, 455/501, 134, 136, 137
    See application file for complete search history.

(56) References Cited

U.S. PATENT DOCUMENTS

| | | | |
|---|---|---|---|
| 5,790,589 A * | 8/1998 | Hutchison et al. ........... 375/149 |
| 6,044,104 A * | 3/2000 | Watanabe ................... 375/142 |
| 6,154,487 A * | 11/2000 | Murai et al. ................ 375/150 |
| 6,167,037 A * | 12/2000 | Higuchi et al. ............. 370/335 |
| 6,345,045 B1 | 2/2002 | Yanagi | |
| 6,370,397 B1 * | 4/2002 | Popovic et al. ............. 455/561 |
| 6,445,728 B1 * | 9/2002 | Byun ......................... 375/142 |
| 6,526,029 B1 * | 2/2003 | Zhong ........................ 370/335 |
| 6,549,545 B1 * | 4/2003 | Yamamoto et al. ......... 370/508 |
| 6,580,749 B1 * | 6/2003 | Miura ........................ 375/147 |
| 6,628,698 B1 * | 9/2003 | Oda ........................... 375/147 |

FOREIGN PATENT DOCUMENTS

| | | |
|---|---|---|
| EP | 0951148 A2 | 10/1999 |
| JP | 11-17648 | 1/1999 |
| JP | 11-27180 | 1/1999 |
| JP | 11-187450 | 7/1999 |
| JP | 11-298401 | 10/1999 |
| JP | 2000-22665 | 2/2000 |

* cited by examiner

Primary Examiner—Jean B. Corrielus
Assistant Examiner—Qutub Ghulamali
(74) Attorney, Agent, or Firm—Foley & Lardner LLP

(57) ABSTRACT

A receiver of a spread spectrum communication system comprises a plurality of despreading circuits, a rake circuit, and a path searcher. The plurality of despreading circuits despreads received signals having multipath components at predetermined timing allocated thereto. The rake circuit performs rake combining of the signals despread by despreading circuits. The path searcher forms a first window showing a part of a search range and calculates delay profile data of said received signals in said first window to search an effective path, forms at least one second window in the search range except said first window and calculates delay profile data of said received signals in said second window, and detects timing at which said received signals are despread based on calculated delay profile data to allocate the detected timing to said despreading circuits.

8 Claims, 7 Drawing Sheets

PATH SEARCH METHOD OF SPREAD SPECTRUM COMMUNICATION SYSTEM AND RECEIVER USING THE METHOD

BACKGROUND OF THE INVENTION

1. Field of the Invention

The present invention relates to a path search method of a spread spectrum communication system and a receiver using the method, and more particularly to a path search method of a spread spectrum communication system, which is effective in miniaturization and reduction in consumption power and a receiver using the method.

2. Description of the Related Art

The receiver of the spread spectrum communication system is used in a CDMA (Code Division Multiple Access) and the like.

Generally, in the receiver of the spread spectrum communication system, a multipart occurs due to reflection and the like. For this reason, regarding the respective multipath components, the receiver of the spread spectrum communication system detects distribution (delay profile) of reception power with respect to delay time at its arrival time, and manages the delay profile data individually.

The receiver of the spread spectrum communication system comprises a plurality of finger circuits that despreads baseband signals, a rake circuit that performs rake combining of the despread signals output from the plurality of finger circuits, and a path searcher that transmits reception timing to the finger circuits.

The path searcher calculates the delay profile data from the baseband signals, and stores them to be equalized at a period of time (one frame) of, for example, 10 ms.

For this reason, the number of path search sample points, which corresponds to oversampling times of a spreading cycle in one symbol, is normally needed, and extends to 1024 in some cases. In the case of using diversity, the number of delay profile data to be stored is doubled as compared with the normal case. This results in the enlargement of the circuit scale of such as a memory that stores the delay profile data, a register, and the like.

The above-mentioned problem results from the conventional path search method. The path search means that the delay profile data are calculated to detect the peak of the calculated delay profile data. The conventional path search method is illustrated in FIG. 7. In FIG. 7, a horizontal axis indicates time and a vertical axis indicates reception power. In the conventional path search method, the delay profile data are calculated in a path search range (one window) of one symbol (t0 to t5) around a maximum peak. In this example, three peaks are detected by comparison among the delay profile data as illustrated in this figure.

In the case where a correlator is operated at one sample point per One delay profile data calculation, the correlators at all sample points are operated, so that power to be consumed is increased.

Since the number of correlators that calculate the delay profile data are related to the number of sample points of the delay profile data, the reduction in the number of sample points decreases the number of correlators, making it possible to reduce power consumption. However, in the simple reduction in the number of sample points, there is a possibility that tracking accuracy of reference reception timing at which the path search is carried out will be also reduced.

SUMMARY OF THE INVENTION

In consideration of the aforementioned problem, the present invention has been made, and an object of the present invention is to provide a path search method of a spread spectrum communication system, which is capable of attaining miniaturization and reduction in consumption power and a receiver using the method.

Another object of the present invention is to provide a path search method of a spread spectrum communication system, which reduces consumption power without deteriorating the tracking accuracy of reference reception timing at which a path search is carried out and a receiver using the method.

In order to attain the above object, according to the first aspect of the present invention, there is provided a receiver of a spread spectrum communication system, the receiver of a spread spectrum communication system comp a plurality of despreading circuits for despreading received signals having multipath components at predetermined timing allocated thereto;

a rake circuit for performing rake combining of the signals despread by despreading circuits; and a path searcher which forms a first window showing a part of a search range and calculates delay profile data of the received signals in the first window to search an effective path, forms at least one second window in the search range except the first window and calculates delay profile data of the received signals in the second window, and detects tiring at which the received signals are despread based on calculated delay profile data to allocate the detected timing to the despreading circuits.

Moreover, according to the second aspect of the present invention, there is provided a path search method of a spread spectrum communication system comprising:

receiving signals including multipath components;

forming a first window showing a part of a predetermined search range to search an effective path;

calculating first delay profile data representing a delay profile of received signals, in the first window to search an effective path;

forming at least one second window in the search range except the first window;

calculating second delay profile data representing a delay profile of the received signals in the second window to search an effective path ; and detecting timing at which despreading the received signals based On calculated first and second delay profile data.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Preferred embodiments of the present invention will be specifically explained as taking a receiver of a spread spectrum communication system as an example with reference to the accompanying drawings.

First Embodiment

Figure 1:
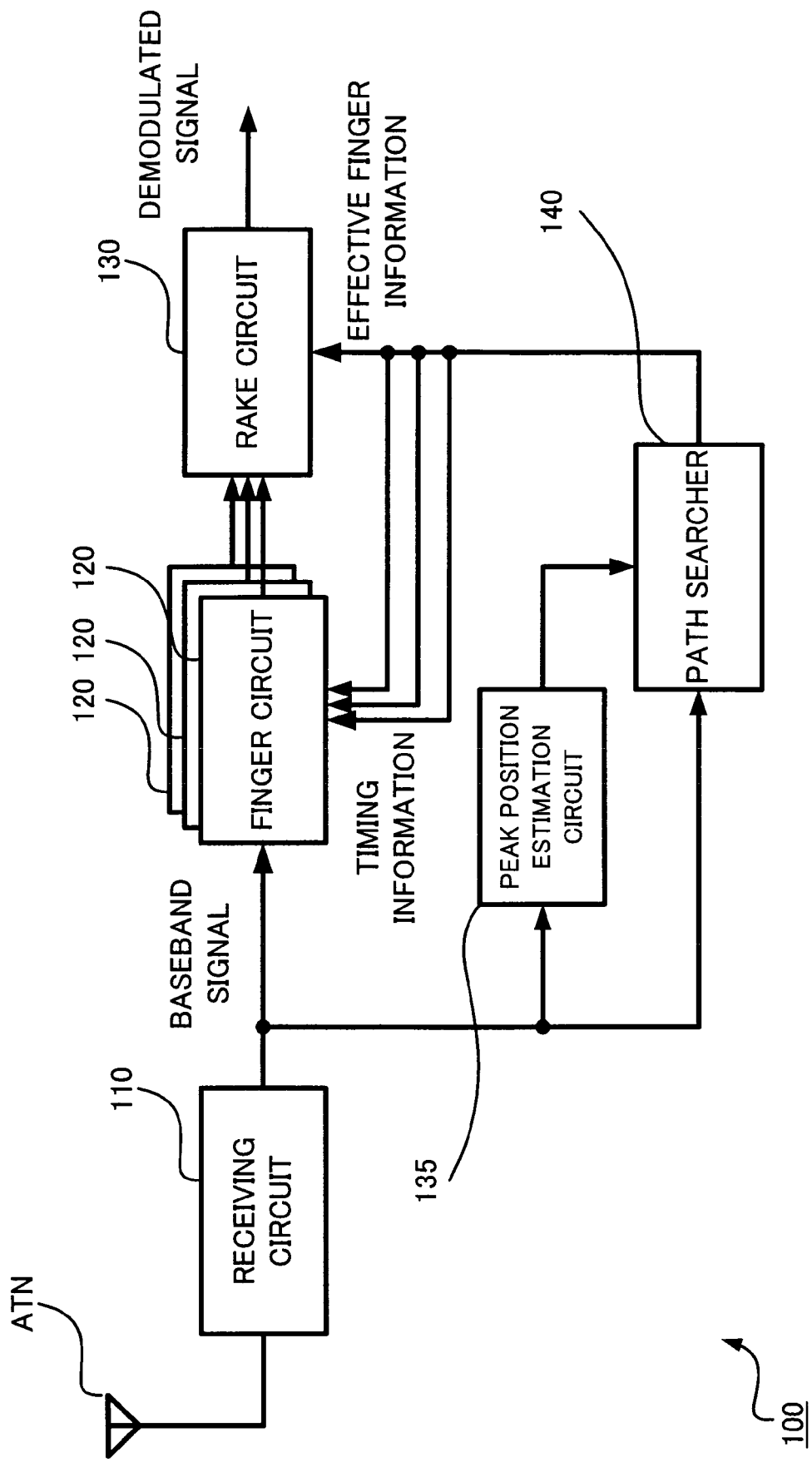
FIG. 1 is a block diagram illustrating a configuration of the substantial part of a receiver of a spread spectrum communication system according to a first embodiment of the present invention.

FIG. 1 illustrates a configuration of a substantial part 100 of the receiver of the spread spectrum communication system according to the first embodiment of the present invention.

The receiver substantial part 100 illustrated in FIG. 1 comprises a receiving Circuit 110, a plurality of finger circuits 120, a rake circuit 130, a peak position estimation circuit 135 and a path searcher 140.

The respective finger circuits 120 are supplied with baseband signals modulated by the receiving circuit 110 via an antenna ANT, and despread the supplied baseband signals at predetermined timing to be described later to output them to the rake circuit 130.

The rake circuit 130 performs RAKE combining of the despread signals output from the respective finger circuits 120 at aligned timing.

A peak position estimation circuit 135 estimates a peak position at a reference timing in the reception by the receiver, and supplies information representing the peak position to the path searcher 140.

The path searcher 140 detects (path-searches) an effective path from the demodulated baseband signals. The path search means that the delay profile data (correlation values) are calculated to detect the peak of the calculated delay profile data in order to obtain timing at which the respective finger circuits 120 receive the baseband signals.

Figure 2:
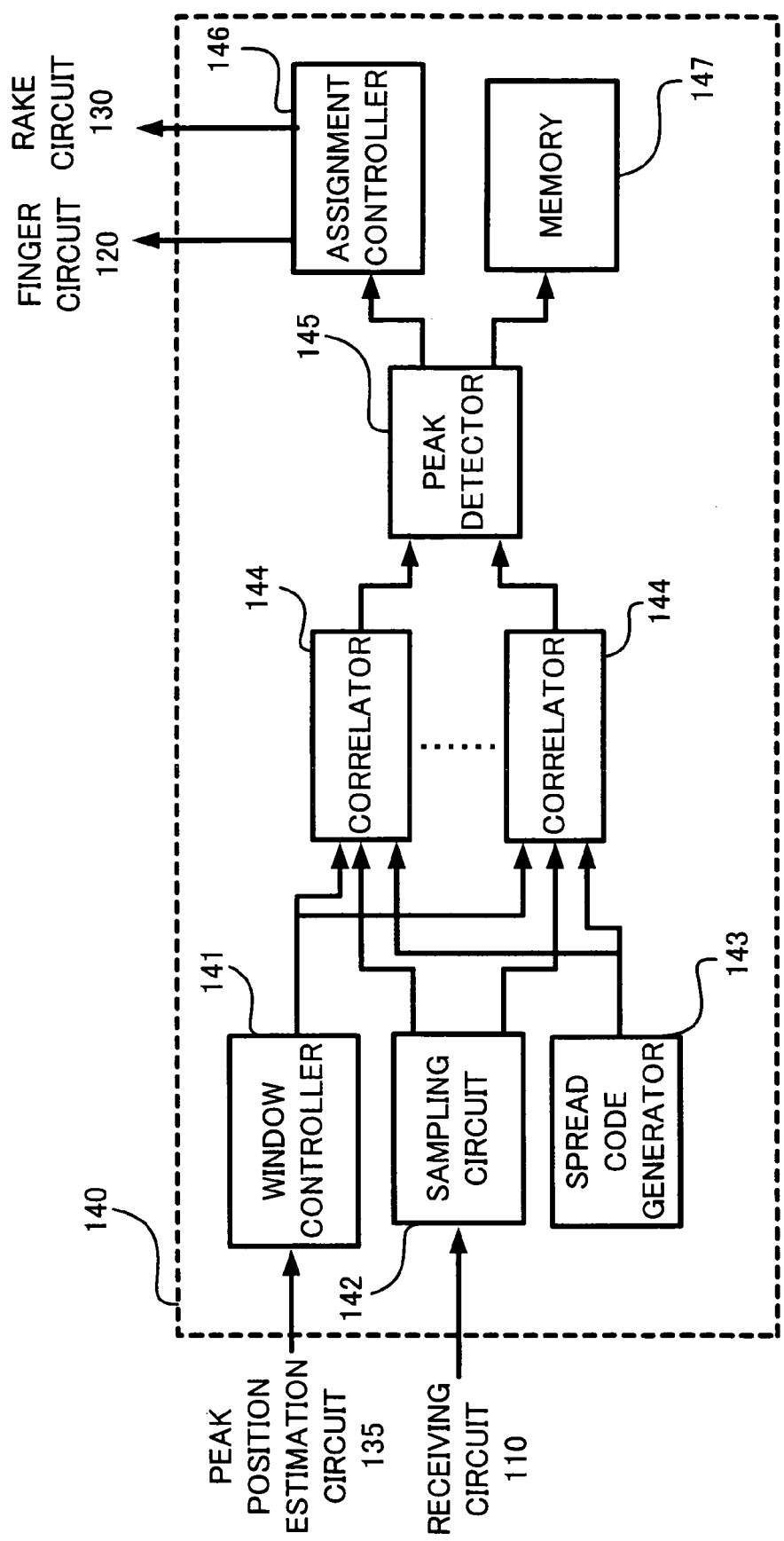
FIG. 2 is a block diagram illustrating a configuration of a path searcher.

As shown in FIG. 2, the path searcher 140 comprises a window controller 141, a sampling circuit 142, a spread code generator 143, a plurality of correlators 144, a peak detector 145, an assignment controller 146, and a memory 147.

The window controller 141 divides a search range for calculating the delay profile data, and sets two kinds of windows to the divided search ranges respectively. The window controller 141 receives the peak position information from the peak position estimation circuit 135, and adjusts the center of a first window (tracking window) to the peak position represented by the received peak position information.

The window controller 141 further sets two independent second windows (search windows) so that those are shifted from the peak position, and selects the second windows alternately. Those two second windows are set in the search range without the area where the first window is set.

The sampling circuit 142 samples the baseband signal, and supplies the sampled signal to the correlators 144. The spread code generator 143 generates spread code, and supplies the generated spread code to the correlators 144.

Each of the correlators 144 receives a control signal from the window controller 141, and calculates correlation between the signal sampled by the sampling circuit 142 and the spread code in accordance with the control signal from the window controller 141. In other words, each of the correlators 144 calculates the correlation between the input signal and the spread cod, in the first window or one of the second windows being selected. Distribution of the calculated correlation values represents the delay profile of the reception signal.

The peak detector 145 compares levels of the correlation values calculated by the correlator 144, and detects peaks whose level is equal to or greater than a predetermined threshold. The peak detector 145 also obtains information representing timings of the peak appearances (timing information), and supplies the timing information to the assignment controller 146.

The assignment controller 146 assigns the timing information to the finger circuits 120 in order of, for example, peak level, based on the timing information supplied from the peak detector 145. Each of the finger circuit 120 despreads the reception signals at a timing represented by the timing information supplied from the assignment controller 146. The assignment controller 146 also provides the rake circuit 130 with information indicating a set of the finger circuit 120 and timing for effective output (effective finger information). The memory 147 stores the calculated correlation values.

Figure 7:
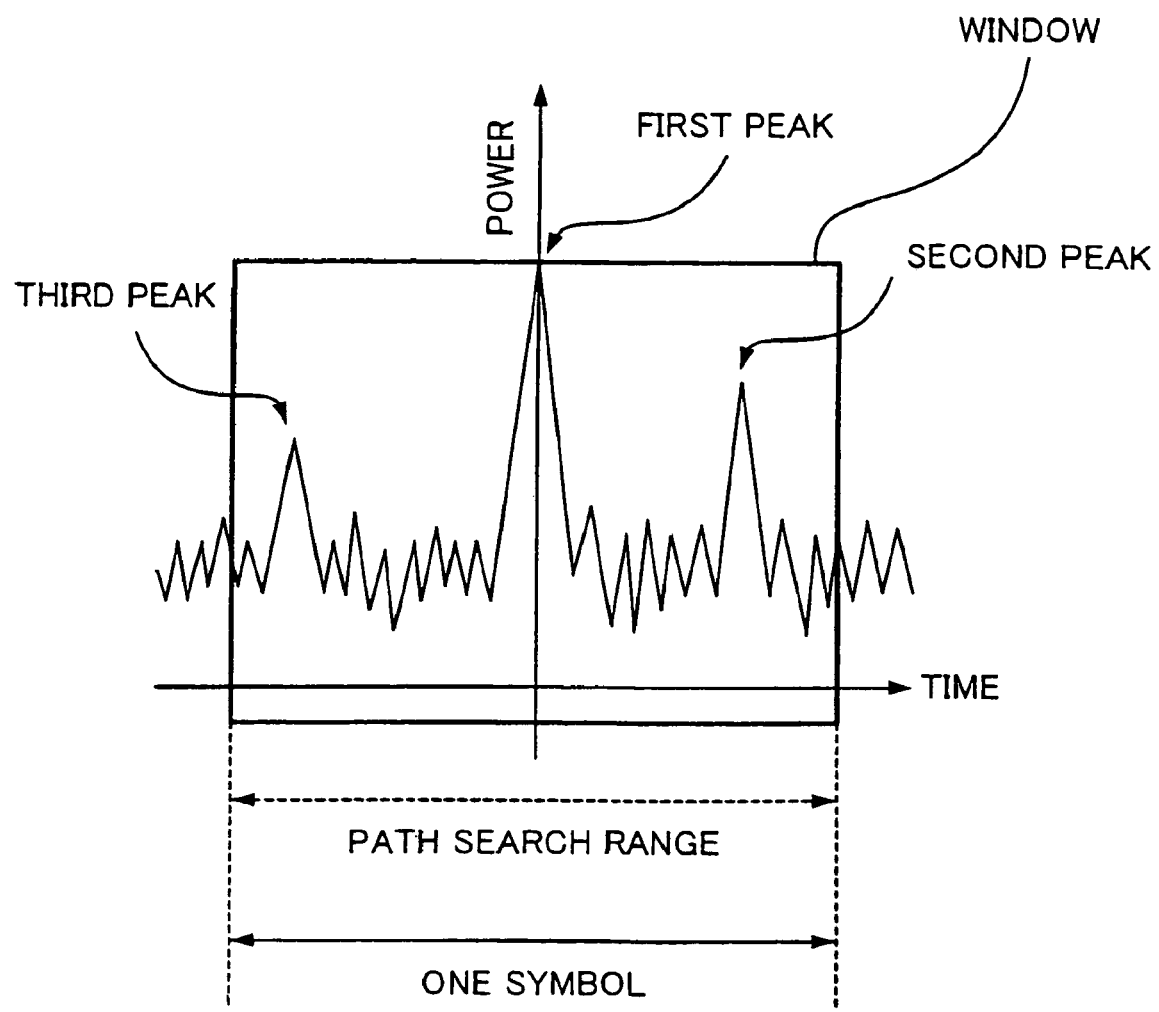
FIG. 7 is a view to explain the conventional path search method.

An explanation will be next given of a path search method using the path searcher 140. In order to make the explanation easily understandable, comparison between this path search method and the conventional path search method will be given. In the conventional path search method, as illustrate in FIG. 7, the path search range of one symbol (t0 to t5) around the maximum peak is used as one window to calculate the delay profile data (correlation values).

Figure 3:
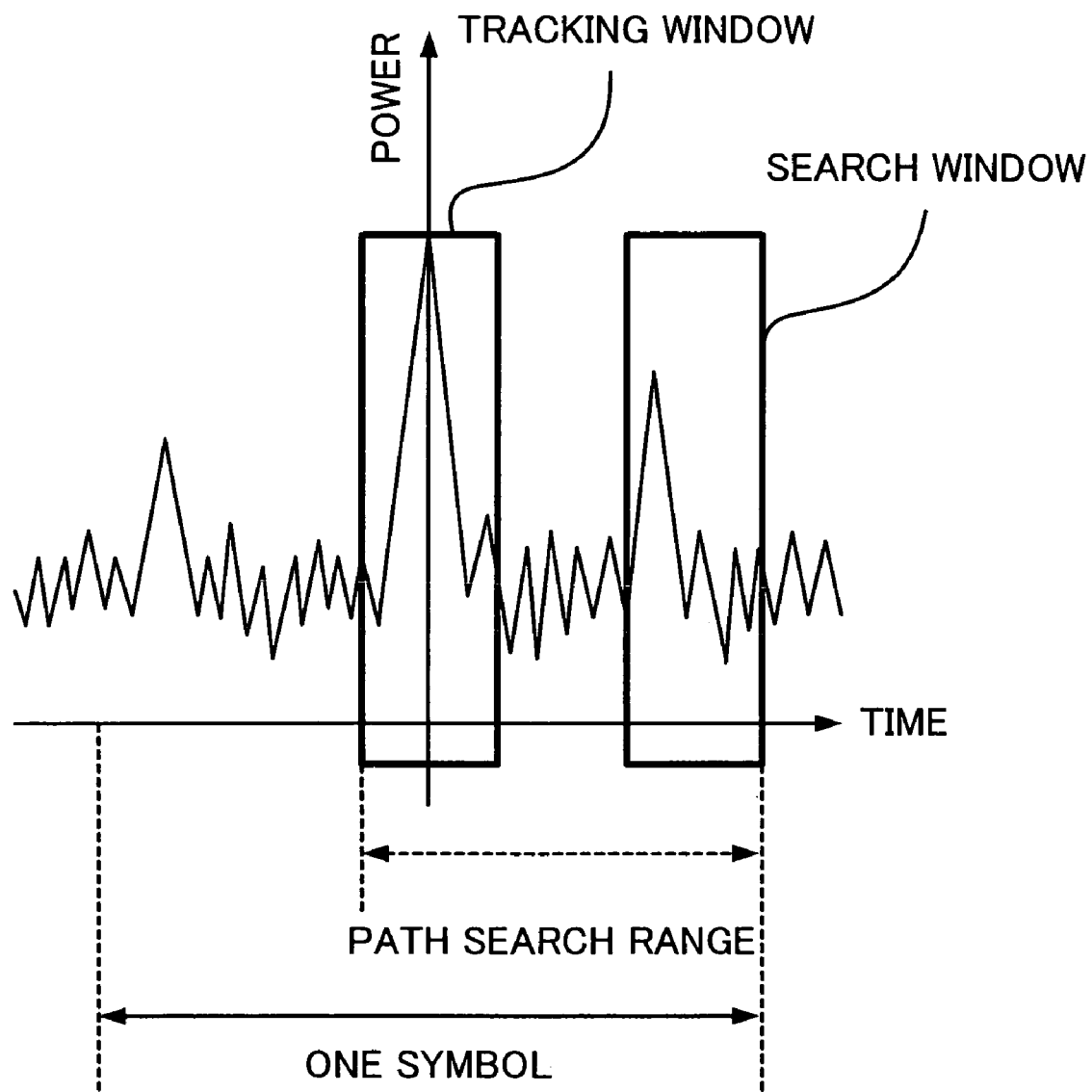
FIG. 3 is a view to explain an operation of the receiver of the first embodiment.

While, the path searcher 140 of the present invention calculates the correlation values using two windows as illustrated in FIG. 3. One of two windows is referred to as a tracking window (first window). The first window is set to be in the path search range corresponding to time, which is shorter than one symbol, and in the vicinity of the center of the maximum peak. The other window is referred to as a search window (second window). The second window is one of two ranges formed by dividing time later than the first window into two. The search window is set to be either path search range alternatively. In this example, two windows have the search range where one symbol time is equally divided into five.

Movement of two windows will be explained with reference to FIG. 4. The path search range where two windows are combined is set to be time (t2 to t5), which is shorter than one symbol. The path searcher 140 uses the tracking window in the range of time t2 to t3 and the search window in the range of time t3 to t4 and that of time t4 to t5 as illustrated in FIG. 4A and FIG. 4B. The state shown in FIG. 4A and the state shown in FIG. 4B are alternately repeated. For example, it is assumed that one correlator is provided in connection with one sample point. The path searcher 140 calculates the correlation values at sample, points corresponding to the number of the plurality of correlators, and stores them. The path searcher 140 performs comparison among the levels of the correlation values at the respective sample points, and specifies timing where a peak whose level shows a maximum value is present. At this time, the path searcher 140 also specifies timing where a peak having a value more than a threshold value (for example, ½ of the maximum value) is present.

Figure 4A:
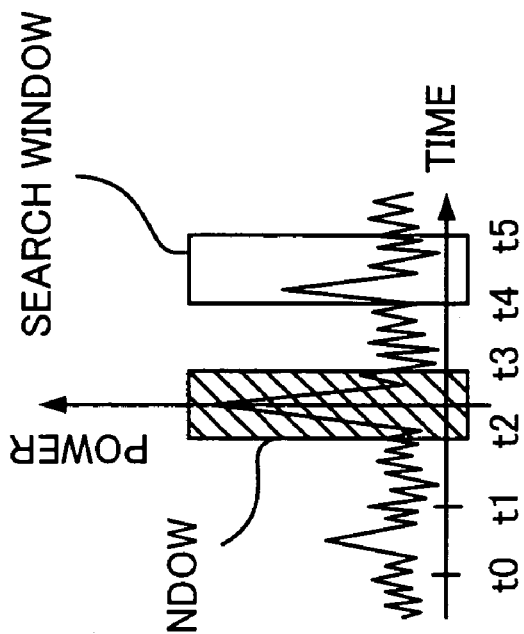
FIG. 4 is a view to explain an operation of the receiver of the first embodiment.
Figure 4B:
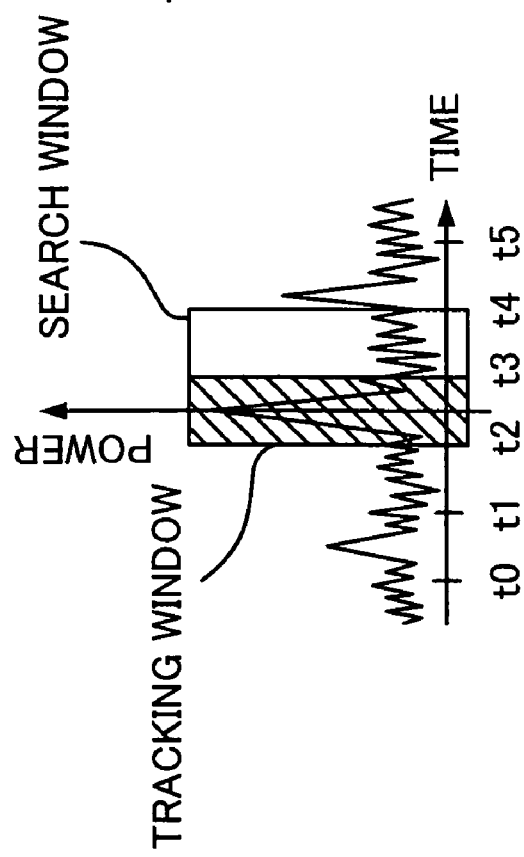

At the time of using the tracking window, the path searcher 140 calculates the correlation values at sample points corresponding to ⅓ of the entire number of sample points by the correlators corresponding to ⅓ of the entire number of correlators through the states shown in FIG. 4A and FIG. 4B. Similarly, at the time of using the search window, the path searcher 140 calculates the correlation values at sample points corresponding to ⅓ of the entire number of sample points by the correlators corresponding to ⅓ of the entire number of correlators through the state shown in FIG. 4A, aside from those utilized at the tracking window using time, Thereafter, the path searcher 140 calculates the correlation values at sample points corresponding to ⅓ of the entire number of sample points by the correlators corresponding to ⅓ of the entire number of correlators through the state shown in FIG. 4B, aside from those utilized in the state shown in FIG. 4A. Namely, in the path searcher 140, the correlators corresponding to ⅔ of the entire number of correlators arc operated at any timing.

In contrast to this, according to the conventional path search method, since the entire sample points are searched at one window, all correlators must be operated. Accordingly, since the receiver of the spread spectrum communication system of this embodiment can reduce the number of correlators that are operating during the path search as compared with the conventional method, the reduction in consumption power can be expected.

In the conventional method, it was necessary to store all correlation values at all sample points in one symbol. However, in the path search method according to the present invention, since the search window is used in a time divisional manner, the amount of information to be stored during the calculation of correlation values may be smaller than the conventional method.

Moreover, in the path search, the tracking must be carried out at reception timing to be used as a reference of the entirety of the receiving system, and the tracking accuracy at this reception timing is important. The receiver according to the present invention calculates the correlation values at the tracking window for each time, so that the peak with high accuracy can be obtained. This is particularly effective in a case that the path search must be carried out for a short time, for example; the receiver is intermittently operated. In the case where the finger circuit 120 is singly formed, the rake circuit 130 becomes unnecessary. Even in such a case, consumption power required to carry out the path search can be reduced.

Second Embodiment

Figure 5:
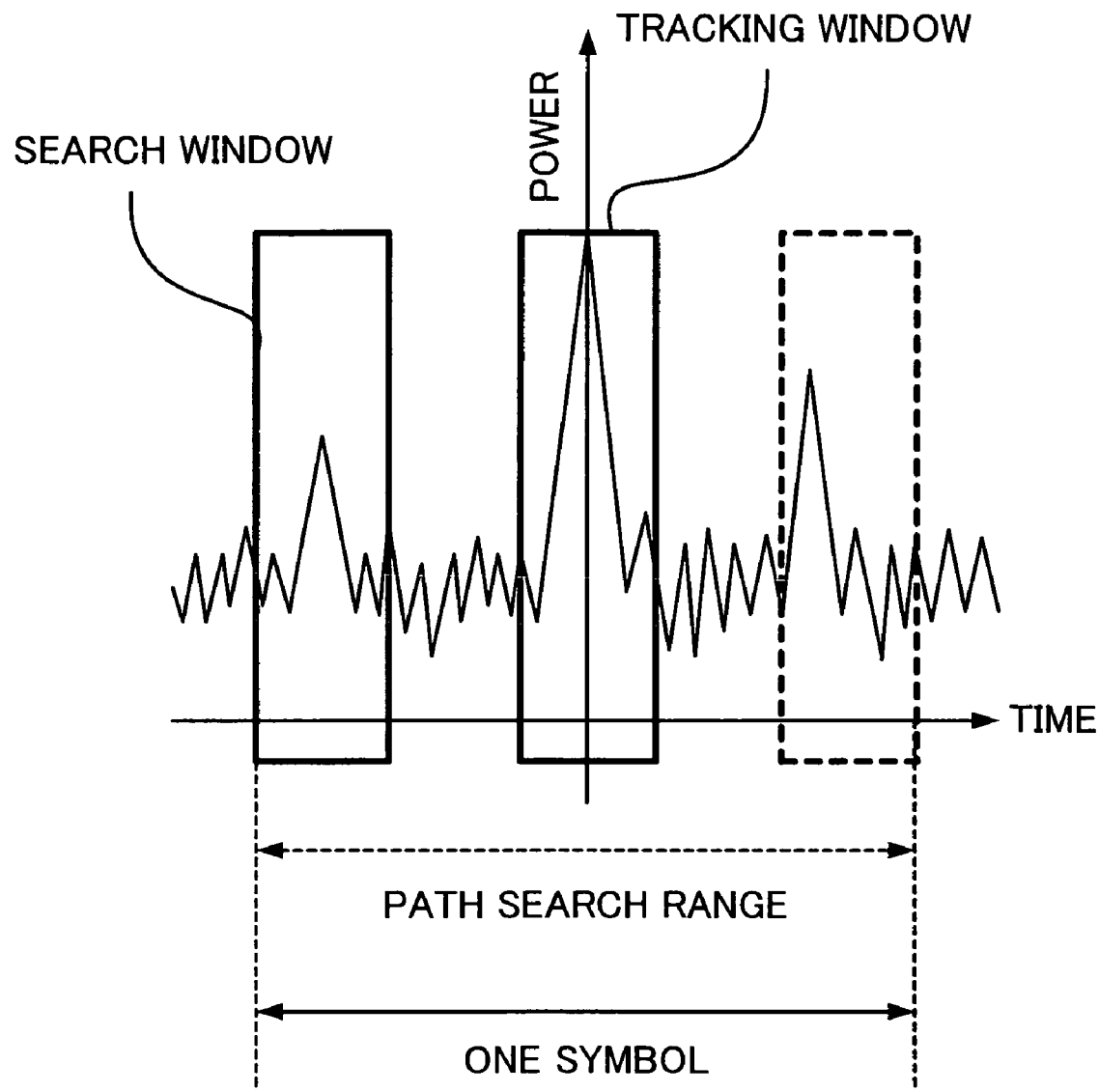
FIG. 5 is a view to explain an operation of the receiver of a second embodiment.
Figure 6:
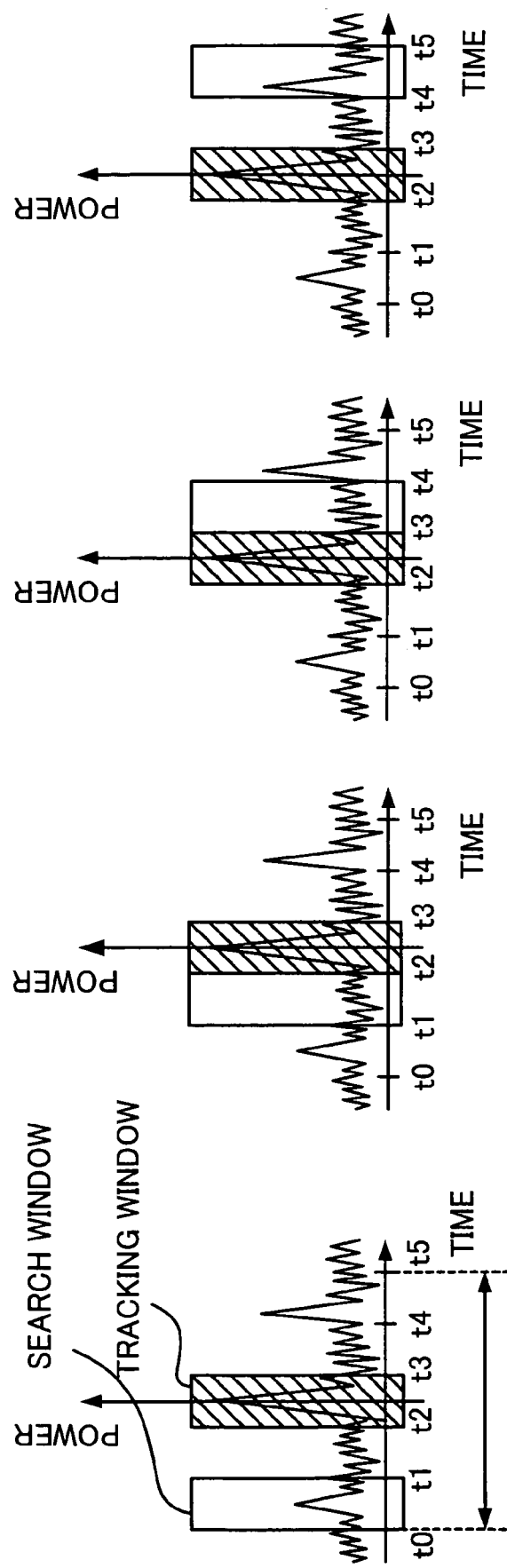
FIG. 6 is a view to explain an operation of the receiver of the second embodiment.

FIG. 5 is a view to explain an operation of the receiver of the spread spectrum communication system of the second embodiment of the present invention. A receiver 200 of this embodiment has fundamentally the same configuration as that of the first embodiment except the point that the path search range is different from the first embodiment. As illustrated in FIG. 5, the search window is set on not only the right side of the tracking window but also the left side thereof, that is, a previous time region. Movement of the search window in this case is illustrated in FIG. 6A to FIG. 6D in order. it is noted that movement is returned to state illustrated in FIG. 6A after state illustrated in FIG. 6D.

In this receiver, since the path search range is wider than the case of the first embodiment illustrated in FIG. 3 and FIG. 4A, and FIG. 4B, there is a demerit in that much time is required to complete the path search. However, for example, even if the receiver is moved and reference timing is abruptly shifted, the path search easily keeps up with variations in reference since the path search range is wider than the case of the first embodiment. Accordingly, the path searcher 140 can take measures in which, for example, the effective finger circuit 120 is allocated more speedily than the case of the first embodiment.

Though the search window is set to two- or four-divided time regions in the aforementioned embodiment, the time region may be divided into the number other than these. Furthermore, regarding the operation in which the path searcher calculates the correlation values using two windows, a controller, which is provided at the outer section of the path searcher, may control the operation. In the abovementioned receiver of the spread spectrum communication system, the path searching operation by the path searcher may be executed by software processing without being limited to the hardware configuration.

As explained above, according to the present invention, the storage quantity of the correlation values during the calculation of the correlation values is reduced without deteriorating the tracking accuracy of reference reception timing at which the path search is carried out, and the number oif correlators that operate concurrently is reduced. This makes it possible to attain miniaturization and reduction in consumption power. Though the above has explained the preferable embodiments, the present invention is not limited to these embodiments.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-035374 filed on Feb. 14, 2000 and including specification, claims, drawings and summary. The disclosure of the above Japanese Patent Application is incorporated herein by reference in its entirety.

What is claimed is:

1. A receiver of a spread spectrum communication system comprising:

a plurality of despreading circuits for despreading a received signal having multipath components at predetermined timings allocated thereto;

a rake circuit for performing rake combining of despread signals output by the plurality of despreading circuits; and a path searcher which forms a first window showing a part of a search range and calculates first delay profile data of said received signal in said first window to search an effective path, forms at least one second window in the search range other than said first window and calculates second delay profile data of said received signal in said second window, and detects timings at which said received signal is to be read based on said calculated first and second delay profile data to allocate the detected timings to said plurality of despreading circuits;

wherein said path searcher forms a plurality of second windows including said at least one second window by dividing the search range excent said first window to calculate said second delay profile data in respective second windows of said plurality of second windows in accordance with a predetermined order; and wherein said path searcher is supplied with peak position information from a peak position estimation circuit which performs rough estimation of a peak position of the received signal, and said path searcher sets a center of said first window at a timing at which the peak position appears.

2. A receiver of a spread spectrum communication system comprising:
   a plurality of despreading circuits for despreading a received signal having multipath components at predetermined timing allocated thereto;
   a rake circuit for performing rake combining of despread signals output by the plurality of despreading circuits; and
   a path searcher which forms a first window a art of a search range and calculates first delay profile data of said received signal in said first window to search an effective path, forms at least one second window in the search range other than said first window and calculates second delay profile data of said received signal in said second window, and detects timings at which said received signal is to be read based on said calculated first and second delay profile data to allocate the detected timings to said plurality of despreading circuits;
   wherein said path searcher forms a plurality of second windows including said at least one second window by dividing the search range except said first window to calculate said second delay profile data in respective second windows of said plurality of second windows in accordance with a predetermined order; and
   wherein said path searcher forms said plurality of second windows in only one of two areas having said first window interposed therebetween.

3. A receiver of a spread spectrum communication system comprising:
   a plurality of despreading circuits for despreading a received signal having multipath components at predetermined timings allocated thereto;
   a rake circuit for performing rake combining of despread signals output by the plurality of despreading circuits; and
   a path searcher which forms a first window showing a part of a search range and calculates first delay profile data of said received signal in said first window to search an effective path, forms at least one second window in the search range other than said first window and calculates second delay profile data of said received signal in said second window, and detects timings at which said received signal is to be despread based on said calculated first and second delay profile data to allocate the detected timings to said plurality of despreading circuits;
   wherein said path searcher forms a plurality of second windows including said at least one second window by dividing the search range except said first window to calculate said second delay profile data in respective second windows of said plurality of second windows in accordance with a predetermined order; and
   wherein said path searcher forms said plurality of second windows in both of two areas having said first window interposed therebetween.

4. A receiver of a spread spectrum communication system comprising:
   a plurality of despreading circuits for despreading a received signal having multipath components at predetermined timings allocated thereto;
   a rake circuit for performing rake combining of despread signals output by the plurality of despreading circuits; and
   a path searcher which forms a first window showing a part of a search range and calculates first delay profile data of said received signal in said first window to search an effective path, forms at least one second window in the search range other than said first window and calculates second delay profile data of said received signal in said second window, and detects timings at which said received signal is to be despread based on said calculated first and second delay profile data to allocate the detected timings to said plurality of despreading circuits;
   wherein said path searcher forms a plurality of second windows including said at least one second window by dividing the search range except said first window to calculate said second delay profile data in respective second windows of said plurality of second windows in accordance with a predetermined order; and
   wherein said path searcher forms two second windows as said plurality of second windows and alternately specifies said second window repeatedly, and said path searcher calculates said second delay profile data in the specified second windows.

5. A path search method of spread spectrum communication system comprising:
   receiving a signal having multipath components;
   forming a first window showing a part of a predetermined search range to search an effective path;
   calculating first delay profile data representing a delay profile of the received signal in the first window;
   forming at least one second window in the search range other than said first window;
   calculating second delay profile data representing a delay profile of the received signal in the second window; and
   detecting timing at which despreading of said received signal is to be performed based on the calculated first and second delay profile data;
   wherein said second window forming step includes forming a plurality of second windows including said at least one second window by dividing the search range excent said first window;
   wherein said second delay profile data calculating step includes calculating said second delay profile data in respective second windows of said plurality of second windows in accordance with a predetermined order; and
   wherein the method further comprises:
     performing rough estimation of a particular delay profile of the received signal; and
     setting a center of the first window at a timing at which a roughly calculated peak position appears in the particular delay profile.

6. A path search method of a spread spectrum communication system comprising:
   receiving a signal having multipath components;
   forming a first window showing apart of a predetermined search range to search an effective path;
   calculating first delay profile data representing a delay profile of the received signal in the first window;
   forming at least one second window in the search range other than said first window;
   calculating second delay profile data presenting a delay profile of the received signal in the second window; and
   detecting timing which despreading of said received signal is to be performed based on the calculated first and second delay profile data;

wherein said second window forming includes forming a plurality of second windows including said at least one second window by dividing the search range except said first window;

wherein said second delay profile data calculating step includes calculating said second delay profile data in respective second windows of said plurality of second windows in accordance with a predetermined order; and wherein said plurality of second windows are formed in only one of two areas having said first window interposed therebetween.

7. A path search method of a spread spectrum communication system comprising:

receiving a signal having multipath components;

a first window showing a part of a predetermined search range to search an effective path;

calculating first delay profile data representing a delay profile of the received in the first window;

forming at least one second window in the search range other than said first window;

calculating second delay profile data representing a profile of the received signal in the second window; and detecting timing at which despreading of said received signal is to be performed based on the calculated first and second delay profile data;

wherein said second window forming step includes forming a plurality of second windows including said at least one second window by dividing the search range except said first window;

wherein said second delay profile data calculating step includes said second delay profile data in respective second windows of said plurality of second windows in accordance with a predetermined order; and wherein said plurality of second windows are formed in both of two areas having said first window interposed therebetween.

8. A path search method of a spread spectrum communication system comprising:

receiving a signal having multipath components;

forming a first window showing a part of a predetermined search range to search an effective path;

calculating first delay profile data representing a delay profile of the received signal in the first window;

forming at least one second window in the search range other than said first window;

calculating second delay profile data representing a delay profile of the received signal in the second window; and detecting timing at which despreading of said received signal is to be performed based on the calculated first and second delay profile data;

wherein said second window forming step includes forming a plurality of second windows including said at least one second window by dividing the search range except said first window;

wherein said second delay profile data calculating step includes calculating said second delay profile data in respective second windows of said plurality of second windows in accordance with a predetermined order;

wherein said second window forming step forms two second windows as said plurality of second windows; and wherein said second delay profile data calculating step alternately specifies the two second windows repeatedly, and calculates the second delay profile data with the specified second windows.

* * * * *